US005543171A

United States Patent [19]
Shores

[11] Patent Number: 5,543,171
[45] Date of Patent: Aug. 6, 1996

[54] PROCESS OF MANUFACTURING A COATED ARTICLE

[76] Inventor: A. Andrew Shores, 212 Carroll Canal, Venice, Calif. 90291

[21] Appl. No.: 125,258

[22] Filed: Sep. 23, 1993

Related U.S. Application Data

[63] Continuation-in-part of Ser. No. 990,709, Dec. 14, 1992, Pat. No. 5,356,706.

[51] Int. Cl.$^6$ ................................. B05D 3/12; B05D 5/10
[52] U.S. Cl. ........................... 427/177; 427/133; 427/208; 427/208.8; 427/209; 427/289; 427/411; 427/412.1

[58] Field of Search .................................. 427/208.4, 177, 427/133, 208, 208.8, 209, 289, 411, 412.1; 106/287.11, 287.16, 287.13

Primary Examiner—Bernard Pianalto

[57] ABSTRACT

An acqueous solution of a dimethylsiloxane containing polyelectrolyte is provided. It incorporates:
  a. polydimethylsiloxane blocks
  b. oxygen, nitrogen or sulfur containing polar groups and
  c. anionic groups.

It provides slip, water repellency and good release per se from pressure sensitive adhesives.

29 Claims, No Drawings

PROCESS OF MANUFACTURING A COATED ARTICLE

This invention is a continuation in part of U.S. patent application Ser. No. 07/990,709, filed Dec. 4, 1992, U.S. Pat. No. 5,356,706.

BACKGROUND OF THE INVENTION

1. Field of the Invention

This invention discloses an acqueous solution of a silicone containing polyelectrolyte suitable for use as a one-component coating, methods for its preparation and application in pressure-sensitive adhesive coated products, such as tapes and labels.

2. Description of the Prior Art

Pressure-sensitive adhesive tapes are generally manufactured and sold with the tape wound upon itself in convolutions to form a roll of some suitable length of tape. Consequently, when it is necessary to use the tape, it must be possible to unwind the desired length from the roll without excessive force or delamination of the backing, offsetting of the adhesive, or the like, regardless of the time or conditions under which the tape has remained in roll form prior to use. For these reasons, a coating known as a release coat or backsize is generally provided on the back side of the tape backing member, i.e., the side opposite that on which the adhesive mass is applied. Such a coat, compared to an uncoated backing member, as is its objective, offers relatively low adhesion to the adhesive mass.

Although various release agents and compositions thereof have been developed over the years, none of them, to my knowledge, accomplish all the objects desired by their use. With some release agents, the release characteristics diminish with time, and particularly at high temperatures, because of some chemical or physical change in the release material per se. Others interact with the adhesive mass so that adhesion to various substrates to which the tape is applied is adversely affected.

Whether a material will be suitable or not as a release agent, in particular for pressure-sensitive adhesive tapes, depends upon a number of factors. The lower the interfacial tension between the adhesive mass and the material used as a release coating, naturally the better release provided. However, low interfacial tension alone is not enough. The material, to be useful as a release coat, should also be of a suitable cohesive strength and possess good adhesion with the backing member.

In the 1970's, silicone emulsions in water were introduced. Generically, they were dimethylsiloxane oligomers with Si-H reactive groups. They had to be mixed with a catalyst prior to application to paper or plastic film, which made them inconvenient 2-component systems. Upon evaporation of water, a surface film of the oligomer was deposited, which built up in molecular weight, crosslinked, and a solid coating resulted. This process, called "cure", needed either high temperatures or long time at moderate temperatures.

The necessity for curing the polymeric material after deposition has placed certain restrictions on the use of silicones. This is because the temperature needed for curing, at least to the extent desired, has often exceeded the temperature which a substrate on which a release coating is deposited could withstand. This has been particularly true where the substrate is thermoplastic film or a paper-thermoplastic film laminate, care being needed to avoid melting or distorting the thermoplastic film. In paper substrates, high temperatures results in overdrying of paper.

A further disadvantage associated with silicone release polymers is their relatively poor adhesion to certain plastic films on which they are coated. This poor adhesion is thought to be due to the scarcity of polar groups in the silicone. Consequently, the use of a primer is often needed to obtain better anchorage of the silicone film to the substrate. In addition the release characteristic in itself is sometimes a problem in that too good a release is provided. Thus, they may be too easy unwind in tape rolls and, in some cases, the adhesion between the adhesive mass and release coat may be so low that the roll doesn't remain tightly wound.

All the prior art known to me discloses either 2-component silicones requiring high temperatures for curing and urethane-siloxane copolymers that can be dissolved in solvents to be suitable as coatings. None discloses a one-component siloxane polyelectrolyte that can be made in and applied from an acqueous solution.

SUMMARY OF THE INVENTION

The above-mentioned disadvantages with the prior art silicone release compounds can be largely eliminated by the siloxane polyelectrolyte and its dispersion in water disclosed herein.

It is accordingly an object of the present invention to provide a release coating which offers improved properties over those heretofore available.

It is a further object of the invention to provide improved backsize compositions comprising the release agent herein disclosed and a film former.

It is a further object of the invention to provide a pressure-sensitive adhesive tape in which the backing member hereof is coated on its backside with the improved release agent of this invention.

It is a further object of this invention to provide an improved process for manufacturing coatings and coated products having good release, slip and water repellent properties. Examples of coatings are release agents for pressure sensitive adhesive tapes, pressure sensitive adhesive labels and write-on office products, such as note pads, coated with a pressure sensitive adhesive. Other examples are water base varnishes, water base printing inks and protective coatings for masonry.

The coating composition of this invention is an acqueous solution of a polyelectrolyte comprising polydimethylsiloxane blocks bonded to oxygen, sulfur and nitrogen containing polar groups through intermediate organic radicals or anionic side chains, wherein said polar groups are selected from the group consisting of ester, amide, carbamate, urea and their thio derivatives, said radicals are selected from the group consisting of alkylene, polyether and polyester blocks, and said anionic side chains are selected from the group consisting of carboxylic acid, sulfonic acid and phosphonic acid reacted with a base.

The compounds of this invention are prepared, in general, by the poly-condensation reaction of at least 3 components:

a. oligomer A with at least 25 per cent polydimethylsiloxane content and 2–3 functional groups selected from the group consisting of hydroxyl, thiol, carboxyl, carboxyacidchloride, primary amino and secondary amino b. monomer B having 2–3 functional groups reactive with said oligomer A or monomer C and selected from the group consisting of hydroxyl, thiol, carboxyl, anhydride, primary amino and secondary amino, and at least 1 anionic or potential anionic group selected from the group consisting of carboxylic acid, carboxylic acid anhydride, sulfonic acid and phosphonic acid, and c. optionally monomer C with 2–3 functional groups reactive with said oligomer A or monomer B, and selected from the group consisting of isocyanate, carboxylic acid, carboxylic acid anhydride, hydroxyl, primary amino and secondary amino d. base reactive with said acidic groups.

If monomer C is a polyisocyanate and monomer B and oligomer A have active hydrogen groups reactive with isocyanates, such as hydroxyl, thiol, primary amino, secondary amino and carboxyl, a polyurethane type silicone containing polyelectrolyte of this invention results by neutralizing the acid with a base.

Silicone containing polyester polyelectrolytes of this invention are prepared from oligomer A and monomers B and C having hydroxyl, thiol, carboxyl, anhydride or carboxychloride reactive groups.

Silicone containing polyamide type polyelectrolyte of this invention are the reaction products with the ingredients a, b and c having primary amino, secondary amino, carboxyl, anhydride or carboxychloride functionality, and the increasing of the pH.

If an atom of oxygen in the reactive functional group of one of the ingredients is replaced by an atom of sulfur, the reaction product becomes a thio derivative, such as thiocarbamate, thiourea or thioester.

In a preferred embodiment of this invention the process for preparing the acqueous polyelectrolyte of this invention generally involves 2 or 3 separate steps: the preparation of a low molecular weight prepolymer, salt formation and chain extension. The prepolymer is formed by reacting a stochiometric excess of monomer B with oligomer A or a stochiometric excess of monomer C with the monomer B and oligomer A to result in an isocyanate, anhydride or carboxychloride terminated prepolymer. Salt formation and solubilization in water occurs by mixing a tertiary amine, usually in a water solution, with the prepolymer. The prepolymer is chain extended to increase its molecular weight by reacting it with a primary or secondary polyamine or water. This process may be combined with the salt formation step to result in one simple processing step. In summary, a preferred process for manufacturing an acqueous solution of a silicone containing polyelectrolyte is disclosed comprising the steps of i. Providing an amine reactive prepolymer comprising the reaction product of a composition comprising in admixture:
   a. an oligomer with at least 25 percent polydimethylsiloxane content having at 2–3 isocyanate reactive groups
   b. a stochiometric excess of a polyisocyanate, and
   c. a monomer having 2–3 isocyanate reactive groups and at least 1 anionic or potential anionic group selected from the group consisting of carboxylic acid, sulfonic acid and phosphonic acid ii. Solubilizing in water said prepolymer with a tertiary amine, and iii. Chain extending with an active hydrogen containing compound selected from the group consisting of aliphatic primary polyamine, aliphatic secondary polyamine, and water.

This invention further discloses a process for manufacturing a coated article having good release, slip and water repellent properties by the use of the acqueous solution of the silicone-containing polyelectrolyte of this invention.

An advantage of the polyelectrolyte of this invention is that it forms a solution or a fine colloidal dispersion in water with the help of a tertiary amine which interacts ionically with the carboxylic acid, sulfonic acid or phosphonic acid group of component B to form an ionic salt and thus an electrolyte. There are several such interactions per polymer molecule and the compound is called a polyelectrolyte. The dilute acqueous solution or microemulsion of such polyelectrolyte can be coated to various substrates, thus circumventing all the disadvantages of coating from a solvent: cost, air pollution, health hazard, fire hazard, and solvent sensitive backings.

A still further advantage is that the copolymer of this invention, unlike silicone emulsion of the prior art, can be diluted down with water to 1%, and, in some cases, even to 0.2% solids, and still wet out on plastic films, providing good release in pressure sensitive adhesive tapes.

The acqueous polymer of this invention, and this is of particular advantage, can be coated onto various substrates without need for any further chemical buildup for their functioning as a film forming coating. It needs not be subjected to curing heretofore deemed necessary with silicone coatings. Thus, high curing temperatures or long processing times can be avoided, thereby lending greater advantage in, e.g., pressure-sensitive adhesive tape manufacturing. One particular advantage resulting from this feature is the fact that the coating of this invention can be used with various heat-sensitive substrates. As a release agent, it can be used in release compositions comprising other film formers. Thus, the number of different film formers that can be used is also enhanced by this feature.

The release agent of this invention offers good adhesion to various substrates, particularly to those used conventionally as backing members in pressure-sensitive adhesive tape manufacture. Moreover, consistent release is provided even with those adhesives which are considered aggressively tacky.

The preferred polyelectrolyte of this invention is alkali soluble or dispersible but water insoluble. That means that it can be dissolved or dispersed in water containing a base or an alkali, such as an amine, or sodium hydroxide. If the alkali is removed from the solution the copolymer precipitates out. This is what seems to be happening following the coating of a backing with a copolymer of this invention solubilized in water with a small quantity of a tertiary amine or ammonia. When water is removed from the backing by heat, the amine is also removed at the same time and the release coating becomes insensitive to water. By contrast, silicone emulsions contain water soluble surfactants that are not removed from the release coating on drying and curing, which make them water sensitive in the adhesive tape.

A still further advantage of the release copolymer of this invention, is that unlike the prior art silicones, it provides adequate but not too easy release to pressure sensitive adhesives. Tape adhesion to its own (release coated) backing is good and the copolymer more readily accepts inks for printing.

The copolymer of this invention is characterized by a combination of properties not found in either moiety alone. The silicone portion, though not 100% of the polyelectrolite, contributes highly desirable release characteristics, such as release from pressure sensitive adhesive, water repellency, oil repellency, and low friction. The polar groups provide good adhesion, without need for a primer, between the coating and various substrate materials. The copolymer portions are linked together with these divalent polar groups, e.g., carbamate, urea, ester, amide thiocarbamate, thiourea, thioester. These groups, as well as aromatic and ionic groups introduced with the monomers B and C increase the glass transition temperature and render the polymer solid when they are present in sufficient amount. In addition, the ionic groups along the polymer chain provide potential solubility in acqueous medium.

Not to be overlooked in the advantages offered by the polyelectrolyte of his invention is the fact that advantageous release properties can be obtained at a cost much less than that of a release agent which is solely a silicone homopolymer. Moreover, satisfactory functional properties, such as water repellency and release in some applications can be obtained even more cheaply by blending the polyelectrolyte of the invention with a less costly film former. When the film former is of greater surface tension than the polyelectrolyte of the invention, the copolymer material will bloom to the surface and the coating composition will exhibit release, slip, hydrophobic, etc. characteristics.

There is further provided by this invention novel pressure-sensitive adhesive coated products containing these polyelectrolytes or compositions thereof on the backing member as a release coat.

DETAILED DESCRIPTION OF THE INVENTION AND THE PREFERRED EMBODIMENTS

The first component, which sometimes is referred to as oligomer A or component A, is a dimethylsiloxane oligomer having at least 2 hydroxyl, thiol, primary amine, secondary amine, carboxyl or acid chloride functionality. Preferably, these reactive groups are bonded to the polydimethysiloxane block through an intermediate group, such as alkylene, alkyleneoxy (polyether) or polyester. The Si—C linkage, unlike the Si—O—C linkage, provides hydrolytic stability.

The oligomer A and its method of manufacture is not in and of itself a part of my invention. The most preferred oligomers in this invention are alfa,omega hydroxyl and amino functional with molecular weight of 1,500–50,000. Hydroxyl terminated oligomers may be conveniently prepared by reacting a polydimethylsiloxane oligomer having SiH endings with an allylalcohol-alkylene oxide condensate: $CH_2=CH—CH_2—O(CH_2CHRO)_pH$, preferably p=5–100. Thiol and amino terminated silicones may be prepared y reacting a linear polydimethyl siloxane oligomer having SiH endings with allyl chloride to form a compound with Si—$CH_2CH_2CH_2Cl$ endings and further reacting with ammonia, an amine or $H_2S$ to provide a primary amine, secondary amine or thiol ended oligomer. The reactive groups may also be located at the side chains of the oligomers. Oligomers having 3 reactive groups are preferred while the ones having 2 reactive groups are the most preferred ones. Their molecular weight is generally 500–100,000 and preferably 1,500–50,000.

The component B is usually a simple organic monomer that has 2 different functionalities: at least one anionic or potential anionic group and 2–3 groups reactive with oligomer A or monomer C. Examples of such compounds are: 2,2'-dimethylol propionic acid, tartaric acid, lysine, N-2-aminoethyl-2-amino-propionic acid, N-2-aminoethyl-2-aminoethane sulfonic acid, the propoxylated adduct of 2-butene-1,4-diol with sodium bisulfite, N-2-aminoethyl-2-aminoethane phophonic acid, benzophenone tetracarboxylicdianhydride, pyromellitic dianhydride.

Components A, B and C are described herein as polyfunctional, e.g. polyisocyanate, polyol, polyamine, etc., meaning at least 2 isocyanate or isocyanate-reactive groups per molecule. In a preferred embodiment of this invention, the functionalities are 2–3 and most often 2–2.3 on the average. High functionality yields crosslinked polymers which results in high viscosity acqueous solutions, and gelation in extreme cases.

The nature and amount of components B, C, compared to the amount of component A, determine the degree of hydrophobicity, and release from, e.g., pressure-sensitive adhesive masses. In general, the greater the proportion of component A, the better the release characteristics, slip properties and hydrophobicity. However, as little as 0.5% polydimethylsiloxane block content derived from the component A provides useful level of release in some applications. There is no upper limit for component. A, except the one that is determined by the stochiometry of the reaction with the other comonomers and the level of anionic group content. Practically, the polydimethylsiloxane content is usually less than 90% and most often less than 80%. For most applications the polydimethylsiloxane content is between 10 and 70% and in the majority of these being between 30 and 60%.

The proportion of monomer C, such as a polyisocyanate, providing hard segments for the copolymer, is generally in the range of 10–70%, and most are in the range of 15–45%.

The amount of monomer B in the copolymer of the invention is also important since it provides alkali solubility through its anionic groups. Useful amounts of COOH content in the copolymer was found to be in the 1–12% range. Lower amounts are not enough to solubilize the copolymer in water while larger proportions render the coating water sensitive. The preferred range is 1.5–8% and the most preferred range is 2–6% COOH. The ionic strength of sulfonic acid and phosphonic acid groups is much higher than that of the carboxylic acid group. Consequently, considerably lower amount of these anionic groups are required to solubilize the polyelectrolite in water.

Optionally, the copolymer of this invention may be crosslinked. This is normally not necessary but may be desirable when the silicon content of the release composition is very high. Suitable crosslinking agents are, for example, multivalent metal compounds, such as chromic nitrate, zinc acetate and polyaziridine compounds. N-(2-aminoethyl)-3-aminopropyl trimethoxysilane, an optional coreactant with the polyisocyanate would also be a crosslinker. These crosslinking agents crosslink the polyelectrolyte instantaneously on evaporation of water from a backing member on which it had been coated.

The siloxane containing polyelectrolyte of this invention is characterized by its molecular weights by means of intrinsic viscosity when measured at 30° C., in a solvent such as tetrahydrofuran. Intrinsic viscosity as low as 0.05 provided good release characteristics.

This disclosure describes in greatest detail the preparation and use of silicone containing polyelectrolyte with polyurethane characteristics, e.g. having carbamate and urea bond, as well as their thio derivatives. However, silicone containing polyelectrolytes with polyamide and polyester characters are also disclosed in detail, examples of their preparation and application are given, so those skilled in the art will be able to practice the invention. Being all condensation type polymers with many structural similarities, the preparations and properties of these polyelectrolytes have many similarities.

The synthesis to form the acqueous urethane polyelectrolyte solution of this invention is preferably carried out in 2 steps. In the first stage of the reaction an isocyanate terminated prepolymer is formed by reacting an isocyanate-reactive dimethylsiloxane oligomer and an anionic containing monomer with a stochiometric excess of a polyisocyanate.

This reaction may be carried out neat or in the presence of a solvent to reduce viscosity. Heat or catalyst may be used to speed up the reaction, although mild reaction conditions, generally below 100° C., are preferable to avoid reacting certain anionic groups with the NCO groups. Suitable solvents are organic liquids containing no active hydrogen capable of reacting with the diisocyanate. Examples of solvents are N-2-methylpyrrolidone, N,N'-dimethylformamide, acetone, dioxane.

In the practice of the invention, a mixture of the reactants can also be prepared by mixing and stirring the various reactants together.

As the reaction tends to be exothermic, it may be only necessary to mix the various components together and permit the temperature to rise to the exotherm temperature and further adjusting the temperature with or without external heating or cooling. The reaction is conducted under anhydrous conditions for such a time at the selected temperature that is practical to provide the desired results.

The quantity of organic polyisocyanates to be used in the invention is dependent upon the quantity of active hydrogen groups in reactant components A and B, the particular isocyanate compound used, the molecular weight of the isocyanate, the NCO/isocyanate-reactive group ratio, etc. All of these factors, while influencing the amount of isocyanate to be used are easily taken into account by one skilled in the art to determine the precise amount of NCO groups required in any particular formulation.

The initial stochiometric ratio of NCO to total isocyanate-reactive groups is generally between 1.3–2.5, usually 1.4–2.

If desired, catalysts that are normally used to accelerate the NCO reaction can be employed in the instant invention. The use of a catalyst is particularly useful to accelerate the secondary OH/ortho-NCO reaction and the SH/NCO reaction. These catalysts include tertiary amines such as triethylamine, tributylamine, pyridine, N-methylmorpholine, and organometallic compounds such stannous octoate, dibutyl tin dilaurate, zinc octoate and cobalt naphthenate. Combinations of two or more of the above catalysts can be used, as is well known. The use of a catalyst or combination thereof in the practice of this invention, however, is immaterial to the basic aspects of the invention.

The NCO terminated prepolymer thus prepared is then further reacted with a polyamine, polyol or polythiol to form a Copolymer. This reaction is called "chain extension". The Total NCO/Total Active H ratio is adjusted to approximately 1:1.

In a preferred embodiment of this invention a primary or secondary aliphatic diamine as well as a tertiary amine is dissolved in water and the prepolymer is poured into it while stirring. The diamine chain extends the prepolymer to form the copolymer almost instantaneously while the tertiary amine interacts with the anionic groups of the copolymer and solubilizes it in water. Typical diamines for chain extension are: isophorone diamine, omega amino polyether, aminoethylpiperazine, polymethylene diamine, xylylenediamine, ethylenediamine, N-(2-aminoethyl)-3-amino-propyl trimethoxysilane, diethylene triamine and any of their mixtures.

The chain extension reaction may also be done prior to solubilizing in water. However, in order to avoid the buildup of high viscosity during the formation of the copolymer, the temperature must be considerably increased or a large amount of solvent must be added to the reactants, or both. None of these options are usually desirable. However, if the chain extension is carried out with a polyol, this is the only option, since they do not react with isocyanates much faster than water which would compete with the diol.

An other option is to neutralize the potential anionic groups first with a tertiary amine followed by chain extension with a diamine. This method is particularly useful with aliphatic isocyanates. Alternatively, the prepolymer may be prepared from a polyisocyanate and a dimethylsiloxane oligomer having at least 2 isocyanate-reactive groups, followed by solubilization with a base and chain extension with an aliphatic primary or secondary polyamine having at least 1 anionic or potential anionic group, such as carboxylic acid, sulfonic acid and phosphonic acid.

The urethane polyelectrolyte of this invention may also be prepared in one step by reacting the ingredients A,B, and C in a way as to have an NCO/isocyanate-reactive ratio being close to 1. In this process the use of large amounts of a solvent is necessary to reduce viscosity. As with the prepolymer method, the copolymer thus formed may be solubilized in water with the help of ammonia or an amine. If a low boiling solvent, such as acetone, was used in the preparation of the polyelectrolyte, it may be conveniently distilled off.

The water solution of the polyelectrolyte, prepared usually at a concentration of 20–40%, can be diluted further with water to provide a solution of the desired concentration, for example 0.25 to 5% by weight solids, for coating. This dilute water solution can be cast on a substrate and the water is evaporated, thereby casting a thin film of the copolymer on the substrate. No crosslinking is usually necessary to obtain functional properties. A small amount of solvent, such as isopropyl alcohol, may be added, if desired.

Any of the polyisocyanates heretofore used for the formation of polyurethanes are suitable for the purposes of the present invention although diisocyanates are preferred. Those diisocyanates which can be used in the practice of the invention, in general, include aromatic, aliphatic and cycloaliphatic diisocyanates. In addition, mixtures of two or more species, kinds and types of the isocyanate functional component can be employed.

Examples of diisocyanates that can be employed in the instant invention include toluene-2,4-diisocyanate, a mixture of toluene-2,4- and toluene-2,6-diisocyanate, metaphenylenediisocyanate, isomers of methylene-bis-phenylisocyanate (MDI), hydrogenated MDI, isophorone diisocyanate, and hexamethylene diisocyanate. Isocyanate terminated prepolymers can also be used.

The Table below summarizes the various ways silicone-containing polyelectrolytes of the polyurethane, polyamide and polyester types may be prepared from the components (COMP) A, B, C and D with the reactive groups listed (R=alkyl):

| COMP | POLYURETHANE | POLYAMIDE | | POLYESTER | |
|---|---|---|---|---|---|
| | | (1) | (2) | (1) | (2) |
| A | OH SH NH$_2$ NHR COOH | COCl | NH$_2$ NHR | COCl | OH SH |
| B | OH SH NH$_2$ NHR COOH | NH$_2$ NHR | COOH COCl Anhydride | OH SH | COOH COCl Anhydride |
| C | NCO | | | | |
| D | | | optional reactive groups NR$_3$ | | |

The acqueous polyelectrolyte solutions of this invention can be used alone or mixed with various polymeric film formers. Such compositions are of particular advantage, as satisfactory release and other functional properties in some instances can be provided much more economically, for example, when the substrate coated is relatively porous as is the case of a paper backing member in the manufacture of pressure-sensitive adhesive tape. The release agent is present in the release composition in only a minor percentage by weight, e.g., in the order of from 0.5 to 5%. Thus, as the siloxane release agent is the more expensive component of the release compositions, its use therein results in considerable savings. As the silicone copolymer of the invention needs not be cured to be a satisfactory release material, it can be intermixed with various film formers including those which heretofore could not withstand the silicone curing temperatures, and therefore could not be used. Examples of film formers in emulsion form are epoxy resins, polyesters, polyvinylacetate, ethylene vinylacetate copolymers, polyamides, polyacrylics, polyurethanes, polyvinylchloride homo and copolymers, and their mixtures. It is theorized that the composition of this invention, being the lower surface tension component in the composition, migrates to the outer surface of a coating, providing the desirable surface characteristics.

The acqueous polyelectrolyte of this invention can be applied to various substrates depending on the application intended, and by various means. Where the substrate is fibrous, e.g., papers and textile fabrics, the polymeric material can be applied by such operations as immersion, spraying, brushing, and roll coating. The more complete the coverage naturally the better the results obtained.

After a layer of the solution is established on the desired substrate, heat, moving air, or their combination may be applied to volatize water and any solvent, if present, thereby leaving a deposit or coating of the release agent or composition on the substrate. The heat necessary to accomplish the desired evaporation depends on the air velocity and the particular solvent used. This can easily be determined by those skilled in the art for any particular situation. The prime consideration is that the volatiles evaporation be complete.

A further aspect of the invention comprises a pressure-sensitive adhesive product which includes a backing member, a pressure-sensitive adhesive and the novel release coating. Such products include tapes, labels and write-on office products such as repositionable note pads, sticky pads, "STIK-EM" notes and "Post-it" notes or pads. The polyelectrolyte of this invention may be applied to these products as release agent, blended into ink that is used to print these products with and as overprint varnish over the ink.

The pressure-sensitive adhesive composition may comprise in admixture an elastomer, a tackifying resin and additives. Other generic adhesives that may be used are polyacrylates, silicones, polyurethanes and vinyl ether polymers.

The pressure-sensitive adhesive composition is applied to the backing member, which may or may not have a primer coating thereon, in the form of a solvent solution, acqueous emulsion or hot-melt. It may be applied to the backing material by any convenient method, as by calendaring, extrusion, kiss roll coating, etc. The solvent or water is removed from the adhesive composition by evaporation by heating. The adhesive product is then generally wound on itself for storage and for slitting into rolls or sheeted out into suitable width and length.

The weight of the pressure-sensitive adhesive composition (on a dry basis) is preferred to be in the range of between about 0.5–4.0 ounces per square yard of backing member, but may be outside this range if required for specific purposes.

As to the backing member, any material ordinarily used for this purpose may be used with the particular material chosen dependent on the end use tape. Examples of suitable backing materials include paper, latex saturated paper, plastics films, glass fabrics, metal foil, or their combinations.

The invention will be further illustrated and described by reference to the following specific examples. The proportions here and elsewhere are expressed as parts by weight unless specifically stated to the contrary.

EXAMPLE 1

The following ingredients were charged into a reactor: 2,4-toluene diisocyanate, 41.2 (473.6 mEq.NCO) and N-2-methylpyrrolidone, 40.0. The mixture was stirred and 2,240-dimethylol propionic acid, 13.4 (200 mEq.OH),, was sifted slowly into the mixture. An exothermic reaction resulted and outside cooling was applied to maintain temperature below 70° C. When the exotherm subsided 1,4-butanediol, 0.99 (22.0 mEq.OH), was then added while cooling was applied. Following the cooling of the reaction mixture to 35° C., 39.0 (42.5 mEq.OH) of a linear dimethylsiloxane oligomer having di-omega functionality of —(CH$_2$)$_3$—O—(CH$_2$CH$_2$O)$_7$H and a molecular weight of 1,830 was stirred in. The mixture was let to react at 65° C. for 2 hours to let all the OH groups consume. The initial NCO/OH was 1.79 and 209 mEq.NCO remained unreacted.

The prepolymer was then chain extended by pouring it into the following solution while stirring vigorously: water, 234, Diamine 230, 25.4 (221 mEq.NH$_2$) and N,N'-dimethyl-2-ethanolamine, 5.9 (66.3 mMole). A clear solution of copolymer of this invention resulted with a viscosity of 1500 cps and pH=8. Ammonia, 2.5, was then added, and the viscosity got reduced to 600 cps and the pH increased to 9.

Diamine 230, is polyoxypropylene diamine with a general formula of H$_2$NCHCH$_3$CH$_2$—(OCH$_2$CHCH$_3$) NH$_2$ and 230 molecular weight.

A small amount of the reaction product solution was withdrawn and the water was allowed to evaporate there-from. A translucent brittle residue remained. Its infrared spectra showed typical bands of a siloxane-urethane polyelectrolyte. The dimethyl siloxane moiety of the copolymer constitutes 19% of the total weight of the copolymer which contained 3.7% COOH.

Intrinsic viscosity, measured in a mixture (9/1 by volume) of tetrahydrofuran/ethanol was determined to be 0.15.

EXAMPLE 2

A 1 mil Mylar A polyethyleneterephthalate film (available from DuPont) was coated with a laminating cement based on nitrile rubber, polychloroprene and zinc resinate.

Solvent evaporation in a forced air oven resulted in a dried adhesive film 1.5 oz/yd$^2$. A woven glass cloth having 32 warp yarns per inch and 8 fill yarns per inch was then superimposed on the dried adhesive layer and was thereby laminated to the polyester film. This was accomplished by passing the superimposed layers together through the nip formed by a pair of steel rolls.

The film side of the film-cloth lamination was then backsized with a 0.5% solution of the release agent of Example 1 made by diluting the solution therein with water. The release composition was applied with a 1 inch diameter bar tightly wound with a 5 mil wire. Volatiles were driven off with forced air at 200° F. leaving a thin release layer on the polyester film.

To the other side of the laminate was then applied a hot melt pressure-sensitive adhesive composition which had been prepared by mixing together at 350° F. the following components: styrene-isoprene-stryrene block copolymer, 100, polyterpene resin of 90° C. melting, 100, glycerol ester of hydrogenated rosin of 5° C. melting, 30, antioxidant, 2. The adhesive composition heated to 350° F. was extrusion coated onto the woven glass cloth at a thickness of 2.4 oz/sq. yd.

The adhesive material thus produced was wound upon itself (60 yards) and slit into 1 inch wide pressure-sensitive adhesives tapes.

The adhesive tapes were then subjected to various tests, as below indicated, to determine the comparative performance characteristics of a pressure-sensitive adhesive tape using a release coat in accordance with the invention. Prior to testing, the adhesive tapes were each submitted to accelerated aging conditions as follows: Dry Heat Aging: Forced air oven at 150° F. for 7 days. Wet Heat Aging: Tape immersed in water at 150° F. for 7 days. All testing was then done at 72° F. 50% R.H. The following results were obtained:
Wet Heat, Unwind Adhesion of Tape at 150 ft/min: 28 oz./in.
Wet Heat, Readhesion to Released Backing, 12"/min: 32 oz/in
Dry Heat, Adhesion to Steel: 132 oz/in,
Dry Heat, Quick Stick to Steel: 29 oz/in.

These results are considered excellent and even somewhat better than the ones normally obtainable with other release agents. The important feature of the release polymer of this invention is that it accumulates all the desirable features of other release agents without having any of their drawbacks: excellent release characteristics, coating from a water solution (instead of a solvent), no curing needed on the backing member, low usage of release agent, good readhesion to the (release coated) backing, good but not too easy release on unwind, acceptance of certain printing inks and absence of transfer of release polymer to the adhesive that would decrease adhesion values.

EXAMPLES 3

This example illustrates the use of thio-substituted monomers that can be used to obtain thiocarbamates in accordance with the invention and the excellent release characteristics obtained with various pressure-sensitive adhesive tapes.

The first step of the polymerization was carried out by dissolving tartaric acid, 18.0 (240 mEq-OH), in a solution of MDI (methylene-bis-4-phenylisocyanate), 50 (400 mEq-NCO) and acetone, 40, and reacting as in Example 1. A linear dimethylsiloxane oligomer with di-omega functionalities of —CH$_2$CH$_2$CH$_2$SH and molecular weight of 4000, 50 parts (25 mEq-SH), was stirred in along with stannous octoacte catalyst, 0.1. When all the active H's were reacted with the NCO's (the total NCO/OH=1.51), the reaction mixture was poured into a stirring solution containing the following ingredients: Isophorone diamine, 5.59 (143 mEq-NH2), 2-dimethylamino-2-methyl-1-propanol, 14.0 (120 mM), and water, 232, to obtain a polyelectrolyte solution of 30% total solids, 1200 cps viscosity and pH=8.5.

The copolymer had polydimethylsiloxane content of 38%, COOH content of 8.7% and intrinsic viscosity of 0.1. It had excellent release characteristics both in pressure sensitive adhesive label and tape applications with various pressure sensitive adhesives.

It also had excellent water repelling properties, when coated out into substrates from a dilute water solution and dried, without necessitating curing.

When compounded into a water base ink and printed on the backside of a polyester, it gave good release without damaging the print pattern.

A 1% solution of the polyelectrolyte was then used as varnish on top of the ink, yielding smooth unwind, gloss and water repellency.

EXAMPLES 4–5

To show the utility of the release agents, according to the invention, with different adhesive formulations, a backsized latex-saturated crepe paper and a corona treated oriented polypropylene (OPP) film were release coated, as in Example 2, with the copolymer prepared in Example 1. The paper backing was adhesive coated with a solvent base natural rubber and styrene-butadiene rubber base adhesive tackified with rosin ester tackifiers, dried in an oven, wound upon itself and slit into ¾"wide rolls of tape (masking application). The polypropylene backing was coated with an acrylic emulsion of pressure sensitive adhesive, dried in oven, wound upon itself and slit into 2" wide rolls of tape (packaging application).

Each of the two tapes were then adhered to a 2"×6" rigid steel plate. Another strip of the same tape was then applied and adhered on top of it (adhesive against release layer). The adhesive strips, were rolled down three times in each direction, with a 4½ lb. rubber covered steel roller, and dry aged, as described in Example 2.

The tapes adhering to the release coating of the tapes adhering to the steel plate (upper tape) were tested for adhesion properties. This testing was accomplished using an Instron Tester at a 90° angle and 50 inches per minute separation. The peeled tapes were then reapplied to a stainless steel (SS) plate to measure quickstick (PSTC-3) and adhesion to stainless steel (PSTC-1). These values are compared with the results obtained with not release coated backings (control). The adhesion values (oz/in) obtained were as follows:

| | |
|---|---|
| Paper Tape To Paper Tape: | 22 |
| Paper Tape To Same Paper But Not Release Coated: | 46 |
| OPP Tape To Same: | 18 |

| | |
|---|---|
| OPP Tape To OPP Not Release Coated: | 54 |
| Paper Tape Separated From Release Same And Reapplied to SS: | 28 |
| Paper Tape, As Is, To SS: | 29 |
| OPP Tape Separated From Same And Reapplied To SS: | 64 |
| OPP Tape, As Is, To SS: | 61 |

The data indicates that good release properties are found with the release agent of the invention with a variety of adhesive formulations and backings.

EXAMPLE 6

The release agent of Example 1 was blended at the 4% (dry/dry) level with Geon 552, a water emulsion of PVC manufactured by the B. F. Goodrich Chemical Co.

The formulation was coated onto a latex impregnated paper backing member in an amount to provide a dry weight of 0.4 oz/yd.$^2$. This was accomplished by heating the coated paper to remove water and fuse the backsize.

The backsize coated backing member was then coated with the rubber base adhesive mass set forth in Examples 4–5, after which the mass coated sheet was slit to 1 inch wide rolls of tape. These were oven aged for 16 hours as in Example 2 ("Dry Heat") and tested for unwind and adhesion. The results are indicated below:

Unwind Adhesion: 22 oz/in

Adhesion to SS: 28 oz/in

It is seen that incorporating a relatively small amount of release agent according to the invention with a film former to form a release composition results in good unwind characteristics.

EXAMPLE 7

This example illustrates the preparation of a silicone containing polyester type polyelectrolyte solution in accordance with the invention and the excellent release characteristics obtained with various pressure-sensitive adhesive tapes.

The first step of the polymerization was carried out by dissolving the following ingredients in N-methylpyrrolidone, 45, and heating in an oven at 70° C. for 2 hours: 3,3'-4,4'-benzophenone-tetracarboxylic-dianhydride, 12 (74.5 mE), silicone oligomer of Example 1, 14.4 (15.2 mE-OH) and triethylamine, 0.1 as a polymerization catalyst. Commercially available trimethylolpropane, 2.512q (56.3 mE-OH), was than stirred in and further reacted for 16 hours at 70° C. The polymer solution was then poured into a mixture of water, 111.7 and triethylamine, 7.6, while stirring vigorously. A solution of TS=15%, and viscosity=600cps, was obtained having excellent release properties when coated out as in Example 2.

EXAMPLE 8

This example illustrates the preparation of a silicone containing polyamide type polyelectrolyte solution in accordance with the invention and the excellent release characteristics obtained with various pressure-sensitive adhesive tapes.

The following ingredients are charged into a reactor: 3,3'-4,4'-benzophenone-tetracarboxylic-dianhydride, 120 (0.745 Eq), N-methylpyrrolidone, 350, and triethylamine, 1 and mildly heated and stirred to obtain a homogenous solution. A linear dimethylsiloxane oligomer of 2000 molecular weight terminated by 3-propylamine groups, 300 (0.3 EqNH$_2$), is slowly poured into the solution while stirring to obtain an anhydride terminated prepolymer, which is then chain extended and neutralized in one step at 60° as in Example 1 with the same diamine, 48 (0.4 EqNH$_2$) and N-(2-aminoethyl)-3-aminopropyl trimethoxysilone, 5.1 (0.0445 mEq.NH$_2$) to obtain a polymer solution in water, TS=33%, Vis=5,300 cps, with excellent release characteristics when coated out and tested as in Example 2.

EXAMPLE 9

A clay coated craft paper, 24 lb/ream, was coated with a 2% solution in water of the polyelectrolyte of Example 1 using a #6 Meyer rod and dried in a 150° F. oven for 5 minutes. The coated paper was laminated with a 1" strip of a pressure sensitive adhesive coated paper taken from a note pad manufactured by 3M Co. under the Post-it brand name. A similar laminate was made with the same craft paper not coated with the polyelectrolyte of this invention (Control).

The laminate was aged in an oven at 120° F. for 2 weeks and tested for T-peel adhesion at a separation rate of 2"/min. The force required to separate the laminates was 20 g/in for the release coated paper and 90 g/in for the uncoated paper.

The invention has been more particularly described in the various examples as a release agent per se or as a component of a release coating composition for pressure-sensitive adhesive tapes. By virtue of its properties, however, the acqueous polyelectrolyte dispersion of this invention will be found suitable in numerous applications. It can be used, inter alia, as a protective, water repellent coating for masonry, such as concrete, stone, etc. Other applications include coating for fibrous containers, conveyor belts, and various coverings and items which come into contact with such sticky and tacky materials such as bread dough, rubber, candy, plastics, the adhesive undersurface of linoleum and the like, during manufacture, transportation, and storage of these materials. Other uses include as a mold release coating and as a release surface from various substrates; water repellant coating in paper, textile, and metal finishing, antiblock and slip agent for inks and coatings.

I claim:

1. A process for manufacturing a roll of linerless pressure sensitive adhesive tape comprising the steps of:

i. providing an isocyanate terminated prepolymer comprising the reaction product of a composition comprising in admixture:

A. an oligomer having at least 25 weight per cent polydimethylsiloxane block content and 2–3 isocyanate reactive groups bonded to said polydimethylsiloxane blocks through intermediate divalent organic groups, said isocyanate reactive groups are selected from the group consisting of hydroxyl, thiol, primary amino and secondary amino, B. an aromatic or aliphatic polyisocyanate, and C. an organic monomer C having 1 or 2 anionic or potential anionic group and 2 isocyanate reactive groups selected from the group consisting of —OH, —SH, —NH$_2$, and —NH—Alkyl, ii. solubilizing and chain extending said prepolymer in water with a tertiary amine and primary or secondary polyamine dissolved in water to form a solution of polyelectrolyte that has at least 10 weight per cent polydimethylsiloxane content and carboxyl content sufficient to solubilize the polyelectrolyte, iii. coating one side of a tape backing with a dilute solution of said polyelectrolyte in water, and removing the water, and iv. coating the backing with a pressure sensitive adhesive, and winding the adhesive tape on itself in a convolution to form a roll.

2. Process according to claim 1 wherein said oligomer is linear and terminated at each end with an isocyanate reactive group.

3. Process according to claim 2 wherein said polyisocyanate, monomer C and polyamine have functionality of about 2.

4. Process according to claim 3 wherein said polyisocyanate is selected from the group consisting of isomers of toluene diisocyanate, isomers of phenylene-bis-diisocyanate, hexamethylene diisocyanate, isophorone diisocyanate, isomers of hydrogenated phenylene-bis-diisocyanate, isomers of xylelene diisocyanate and combinations thereof.

5. Process according to claim 4 wherein said polyisocyanate is aromatic.

6. Process according to claim 3 wherein said monomer C is selected from the group consisting of 2,2'-dimethylol propionic acid, tartaric acid, lysine and 2-aminoethyl-2-aminopropionic acid, N-2-aminoethyl-2-aminoethane sulfonic acid, the propoxylated adduct of 2-butene-1,4-diol with sodium bisulfite, N-2-aminoethyl-2-aminoethane phosphonic acid, and combinations thereof.

7. Process according to claim 6 wherein said monomer C is 2,2'-dimethylol propionic acid.

8. Process according to claim 3 wherein said polyamine is selected from the group consisting of isophorone diamine, amino terminated polyether, menthane diamine, aminoethylpiperazine, polymethylene diamine, isomers of xylelene diamine and combinations thereof.

9. Process according to claim 2 wherein said oligomer is 1,500–50,000 molecular weight with —(CH$_2$)$_3$—O—(CH$_2$CH$_2$O)$_n$H termination, wherein n=5–100.

10. Process according to claim 9 wherein the molecular weight is 1,500–4,000, n is about 7–34 and the carboxyl content of said polyelectrolyte is 2–6 weight per cent.

11. Process according to the claim 10 wherein n is about 7, said polyisocyanate is an isomer of toluene diisocyanate or a mixture of the isomers, said monomer C is 2,2'-dimethylolpropionic acid, said polyamine is an amine terminated polyether and said tertiary amine is triethylamine or N,N'-dimethyl-2-ethanol amine.

12. Process according to claim 1 wherein said prepolymer comprises an additional organic monomer, other than C, having 2–3 isocyanate reactive groups selected from the group consisting of —OH, —SH, —NH$_2$, and —NH—Alkyl.

13. Process according to claim 1 wherein said solution of polyelectrolyte comprises a minor amount of an inert solvent mixed therein.

14. Process according to claim 1 wherein said step ii is performed in 2 separate steps comprising a. solubilizing with a tertiary amine, and then b. chain extending with a primary or secondary polyamine dissolved in water.

15. Process according to claim 1 wherein said step iv is performed before iii.

16. Process according to claim 1 wherein said adhesive is selected from the group consisting of adhesives based on styrene-isoprene-styrene block copolymers, natural rubber, styrene-butadiene rubber and polyacrylates, and combinations thereof.

17. Process according to claim 1 comprising the additional step, prior to step iii, of mixing a minor amount of said polyelectrolyte in solution with a major amount of a film forming polymer dispersed in water.

18. Process according to claim 17 wherein said film forming polymer is selected from the group consisting of polyvinyl acetate, ethylene-vinyl acetate copolymers, polyacrylates, polyvinyl chloride homo and copolymers and epoxy resins.

19. Process according to claim 1 comprising the additional last step of printing the release coated side of said tape with an ink.

20. Process according to claim 19 wherein said ink comprises a minor amount of said polyelectrolyte.

21. Process according to claim 1 wherein the manufactured product is a label or repositionable pad.

22. A process for manufacturing a pressure sensitive adhesive coated product comprising the steps of:
   a. providing an aqueous solution of a polyelectrolyte containing anionic groups, and ester or amide groups, and comprising 10–70 weight per cent of an oligomer having at least 25 weight per cent polydimethylsiloxane block content, said anionic groups are reacted with a base and selected from the group consisting of carboxylic acid, sulfonic acid and phosphonic acid, and said polydimethylsiloxane blocks are bonded to said ester or amide groups through divalent organic groups,
   b. coating a substrate with said polyelectrolyte dissolved in water, and removing water from the coating, and
   c. coating said substrate with a pressure sensitive adhesive.

23. Process according claims 22 wherein said polyelectrolyte is the reaction product of the ingredients comprising
   a. said oligomer having 2–3 —OH, —SH or —COOH groups, and
   b. a monomer having 2–3 anhydride, —COOH, —COCl, —OH or —SH groups reactive with said oligomer to form ester bonds.

24. Process according to claim 23 wherein said oligomer has 2 OH groups and said monomer has 2 anhydride groups.

25. Process according to claim 22 wherein said polyelectrolyte is the reaction product of the ingredients comprising:
   a. said oligomer with 2–3 —NH$_2$, —NH—Alkyl or —COOH groups, and
   b. a monomer having 2–3 anhydride, —COOH, —COCl, —NCO, —NH$_2$ or —NH—Alkyl groups reactive with said oligomer to form amide bonds.

26. Process according to claim 25 wherein said oligomer has 2 NH$_2$ groups and said monomer has 2 anhydride groups.

27. A process according to claim 22 comprising the additional step, prior to step b, of mixing a minor amount of said polyelectrolyte solution with a major amount of a film forming polymer dispersed in water.

28. Process according to claim 22 wherein the manufactured product is a label or repositionable pad.

29. A process for manufacturing a roll of linerless pressure sensitive adhesive tape comprising the steps of:
   a. providing an aqueous solution of a polyelectrolyte containing anionic groups, a combination of carbamate or thiocarbamate and urea groups, and polydimethylsiloxane blocks in the amount not less than 10 weight per cent, said anionic groups are bonded to a carbon atom, reacted with a base, and selected from the group consisting of carboxylic acid, sulfonic acid and phosphonic acid, and said polydimethylsiloxane blocks are bonded to said carbamate or urea groups through divalent organic groups,
   b. coating one side of a tape backing with a dilute solution of said polyelectrolyte in water, and removing the water, and
   c. coating the backing with a pressure sensitive adhesive, and winding the adhesive tape on itself in a convolution to form a roll.

* * * * *